United States Patent [19]
Stingelin

[11] 3,883,338
[45] May 13, 1975

[54] PROCESS AND APPARATUS FOR THE PRODUCTION OF SHEET GLASS

[75] Inventor: Valentin Stingelin, Aire/Geneve, Switzerland

[73] Assignee: Battelle Memorial Institute, Geneve, Switzerland

[22] Filed: June 5, 1974

[21] Appl. No.: 476,403

Related U.S. Application Data

[63] Continuation-in-part of Ser. No. 276,588, July 31, 1972, abandoned.

[30] Foreign Application Priority Data
Aug. 11, 1971 Switzerland.................... 11787/71

[52] U.S. Cl. .................. 65/91; 65/25 A; 65/99 A; 65/182 R; 65/199
[51] Int. Cl........................................... C03b 18/02
[58] Field of Search.......... 65/91, 99 A, 182 R, 199, 65/25 A

[56] References Cited
UNITED STATES PATENTS

| | | | |
|---|---|---|---|
| 3,345,149 | 10/1967 | Michalik et al................ | 65/25 A X |
| 3,440,030 | 4/1969 | Thompson et al................. | 65/99 A |
| 3,468,650 | 9/1969 | Boaz................................ | 65/99 A X |
| 3,520,672 | 7/1970 | Greenler et al.............. | 65/182 R X |
| 3,655,356 | 4/1972 | Javaux ............................ | 65/182 R |
| 3,718,450 | 2/1973 | Ohsato et al.................. | 65/182 R X |

*Primary Examiner*—Robert L. Lindsay, Jr.
*Attorney, Agent, or Firm*—Karl F. Ross; Herbert Dubno

[57] ABSTRACT

In order to produce sheet glass of a thickness less than normal equilibrium thickness from a layer of molten glass deposited on a fluidic support, a solid structure with a plenum chamber is positioned above the support while air or other gas under pressure is discharged from the plenum chamber, through a peripheral slot, in a downwardly converging gas curtain which builds up a pressure head in the space between the support and the flat underside of the structure. This pressure head may be utilized to balance the weight of the overlying structure for floatingly maintaining same above the support in spaced relationship with the glass layer deposited thereon. By providing several generally concentric peripheral slots through which the gas is discharged in successive stages, starting with the innermost slot, or by making the structure adjustable to allow a shifting of its slot-forming gap, the air curtain may be expanded laterally or possibly omnidirectionally to reduce the width of the beads bounding the thinner central portion.

14 Claims, 20 Drawing Figures

PROCESS AND APPARATUS FOR THE PRODUCTION OF SHEET GLASS

CROSS-REFERENCE TO RELATED APPLICATIONS

This application is a continuation-in-part of my copending application Ser. No. 276,588, filed July 31, 1972, now abandoned and also relates to the subject matter of my copending application Ser. No. 361,942, filed May 21, 1973 as a continuation-in-part of my earlier application Ser. No. 126,789 filed Mar. 22, 1971, now Pat. No. 3,749,563.

FIELD OF THE INVENTION

The present invention relates to a method of and means for making sheet glass of different thickness, including thin sheets of about three to four millimeters or less, of perfect planeness and evenness.

BACKGROUND OF THE INVENTION

There is known a method of manufacture called the float process according to which a sheet glass is produced by pouring a mass of molten glass onto a bath of a liquid or higher density, specifically molten tin, this mass being left to spread naturally over the bath and progressively reaching a so-called equilibrium thickness of about 6.3 mm under normal atmospheric pressure. The production of sheets of glass of lesser thickness can be achieved only by performing a subsequent drawing treatment on sheets initially having this equilibrium thickness; the thinner the sheet it is desired to produce, the longer and more complex the drawing treatment will be.

It has also been suggested that the bath of molten tin, acting as a support for the mass of glass pouring out of the furnace, be replaced by an air mattress or cushion. In such an event, the equilibrium thickness of the sheets of glass that can be produced is about the same as with the float process.

Attempts have also been made to reduce this fixed thickness by compressing the mass of molten glass with the aid of two counteracting air cushions between which the mass is advanced while being shaped.

In a conventional system for carrying out this method, the air under pressure used to form the cushions is discharged through a large multiplicity of modular chambers (on the order of 1,500 per m²), the air of each cushion being continuously exhausted through suitable outlet openings located within the immediate proximity of each modular chamber.

In another known system of this type, the two counter-acting air cushions are formed with the aid of confronting plates bracketing the flow of molten glass to be shaped, each plate being provided over its entire area with a plurality of throughgoing passages that are connected to a common source of compressed air via valves which serve to regulate the pressure of the air circulating in each passage to form the air cushion of each plate. In this system, the escape of the air from the two air cushions takes place exclusively by a free flow between the plates and the glass toward the edges of the plates.

In my prior patent and application Ser. No. 361,942, referred to above, I have disclosed a system enabling the production of flat sheet glass of less than equilibrium thickness bu relatively simple means enabling free selection of that thickness within rather wide limits. For this purpose a layer of molten glass is deposited on a predetermined surface area of a fluidic support, such as a tin bath or an air film; a solid structure with a flat underside is positioned above that surface area with clearance from the glass layer to define a limited space therebetween. A descending and downwardly converging gas (preferably air) curtain is generated around this space to build up an above-ambient pressure head therein which bears from above upon the glass layer, thus crushing the latter. The overlying solid structure may be floatingly maintained above the glass surface by the excess pressure build up in the intervening space.

The thickness of the crushed portion of the glass layer underlying the high-pressure space can be controlled through adjustment of the flow rate of the gas (referred to hereinafter, for convenience, as air) in the surrounding curtain. This flow rate, in turn, can be regulated through the establishment of a suitable air pressure in a plenum chamber communicating with a peripheral slot or gap of the structure through which the air is discharged, preferably at an angle to the vertical ranging between substantially 45° and 70°. Since the air must impinge upon the glass layer rather than upon its fluidic support in order to generate the necessary pressure head, the reduced-thickness portion of that layer will always be bounded by a heavier marginal zone, of approximately equilibrium thickness, which must subsequently be detached from the glass sheet and which represents a certain amount of waste — e.g., in terms of thermal energy — even though the vitreous material of that marginal zone can be comminuted and melted down for subsequent reuse. With a continuously advancing glass layer, the marginal zone forms a pair of longitudinal edge beads whose width depends on the difference between the width of the glass layer and the transverse dimension of the air curtain. Moreover, the pressure head overlying the central portion of the glass layer acts to broaden the latter while crushing that portion; thus, the width of the edge beads tends to increase as the glass layer stabilizes at the selected thickness.

OBJECTS OF THE INVENTION

An important object of my present invention is to provide an improved system of the type disclosed and claimed in my prior U.S. Pat. No. 3,749,563 having means for enabling a diminution of the width of the heavier marginal zone bounding the reduced sheet portion, whether the glass layer remains stationary or is continuously advanced during reduction of its thickness.

A related object is to provide a method of reducing the thickness of a glass layer with minimization of the width of its marginal zone and, consequently, with maximum utilization of the available glass mass.

A more particular object is to provide a method of and means for producing a glass sheet of reduced thickness (i.e., below equilibrium thickness) whose width exceeds that of an original glass layer fed out from a furnace.

SUMMARY OF THE INVENTION

I realize these objects, in accordance with my present improvement, by subjecting an intermediate portion of the glass layer to an overlying pressure head within a limited area, bounded by a descending air curtain, thereby reducing the thickness of the layer at that intermediate portion with reference to the thickness of the surrounding marginal zone of equilibrium thickness, and expanding this air curtain as the layer broadens with the thinning of its intermediate portion. This enables a widening of the area of reduced thickness beyond the original width of the glass layer.

Such expansion of the air curtain can be carried out in several ways. Thus, the structure overlying the fluidic support may have several substantially concentric gaps through which the air may be alternately discharged in successive stages of operation, starting with the innermost gap and switching progressively to the surrounding gaps. This procedure is particularly advantageous in the case of a static glass layer in which, upon solidification, the reduced central portion is bounded on all sides by a adjustable, as by providing extensions on a central plate and on a surrounding cap or hood defining therewith the air-discharge slot, in order to allow for a lateral outward shifting of this slot. The latter arrangement is advantageous in cases where the glass layer is continuously cast upon its fluidic support so as to advance longitudinally therealong, since in that instance only the width of the air curtain transverse to the direction of glass flow needs to be varied.

BRIEF DESCRIPTION OF THE DRAWING

The above and other features of my invention will now be described in detail with reference to the accompanying drawing in which.

SPECIFIC DESCRIPTION

Figure 1:
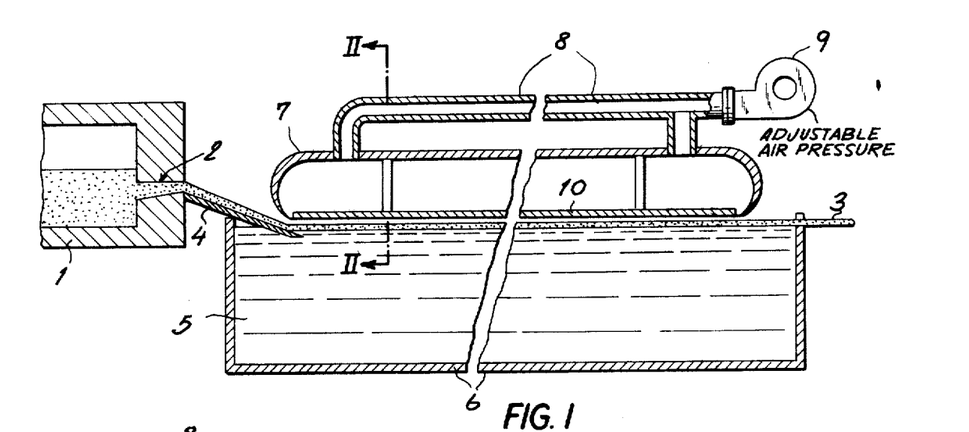
FIG. 1 is a longitudinal section of a system of the type disclosed in my prior U.S. Pat. No. 3,749,563.

The installation illustrated in FIG. 1 comprises a glass-melting furnace 1 having an opening 2 for discharging a mass of molten glass 3 over a ramp 4 which feeds the mass to the upstream end of a bath 5 of molten tin contained in a trough 6. The walls of the trough are heated by gas or oil burners or by electric heating elements, not shown, to a relatively high temperature, on the order of 1,100°C.

The metallic bath 5 serves as a fluidic support for the glass, as in the conventional process, during the forming stage. In the present system, however, the thickness of the sheet of glass that is produced can have practically any value, below the above-mentioned equilibrium value of 6.3 mm.

To this end, the installation comprises a hollow cover or hood 7 which is located above the trough 6 and which extends practically over the entire area of the tin bath 5, the interior of this hood forming a plenum chamber connected by conduits 8 to a source of gaseous fluid under pressure, e.g., air, diagrammatically represented by a centrifugal blower 9.

The gaseous fluid preferably, but not indispensably, has a temperature such that if this fluid were brought into contact with the glass that is floating on the tin bath 5, the glass would not be subjected to excessive heat stresses.

In the bottom opening of the hood 7 there is arranged, with all-around clearance, a plate 10 extending horizontally over the tin bath 5.

Figure 3:
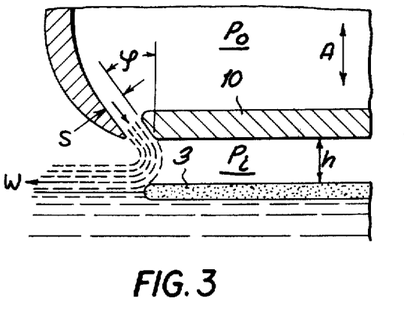
FIG. 3 is an enlarged replica of part of FIG. 2, showing a detail.

As will be observed from FIG. 3, the edge of the solid structure constituted by the plate 10 is so cut as to form a chamfer having an angle of inclination $\phi$ with reference to a vertical plane, the portion of the hood surrounding this edge extending parallel to the chamfer of the plate 10, at a distance S therefrom.

If $p_o$, $p_i$ and $p_a$ are respectively the magnitude of the pressure prevailing inside the hood 7, the magnitude of the pressure head built up between the plate 10 and the sheet of glass whose thickness is to be controlled, and the magnitude of the pressure prevailing outside the hood (ambient pressure);

if $w$ is the flow speed of the gaseous fluid introduced into the space between the flat underside of plate 10 and the sheet 3 from the source 9, as it passes through the peripheral gap 14 of width S defined by the plate 10 and the hood 7, over the entire circumference of these members;

if $\rho$ is the specific weight of this gaseous fluid;

if $h$ is the distance between the plate 10 and the sheet of glass 3;

and, finally, if it is supposed that the jet of gaseous fluid that issues from the plenum chamber at angle $\phi$ toward the tin bath 5 does not enter the space of height $h$ bounded by the plate 10 and is simply deflected outwardly along a substantially horizontal path with maintenance of a substantially constant cross-section of the jet of gas whereby the initial mean speed $w$ of the jet remains unchanged and the jet is not subjected to any pressure drop despite the deflection which it undergoes — then the internal pressure $p_i$ is greater than the external pressure $p_a$ by an amount equal to $$\Delta p = p_i - p_a = \rho \frac{w^2}{2} \cdot 2 \cdot (1 + \sin\phi) \cdot \frac{S}{h}.$$

The internal pressure $P_o$ does not enter into this formula except to the extent that the flow speed $w$ is a function of that pressure.

From the above relationship, it will be observed that the magnitude $\Delta p$ is least when the angle $\phi$ is equal to 0, amounting to $$\Delta p = p\,\frac{w^2}{2} \cdot 2 \cdot \frac{S}{h},$$

and is greatest when $\phi = 90°$, $\Delta p$ then amounting to $$\Delta p = p\,\frac{w^2}{2} \cdot 4 \cdot \frac{S}{h}.$$

In practice, purely constructive considerations lead to the adoption of an angle $\phi$ of less than 90°, e.g., on the order of 45° to 70°. The downward convergence of the air curtain, with a vertex angle of $2\phi$ has been indicated in FIG. 2.

It will thus be appreciated from the above that, whenever the hood 7 is supplied with gaseous fluid in the manner indicated through the gap between the hood and the plate, the pressure head of the mass of air lying between this plate and the sheet of glass to be formed, which at first is equal to the atmospheric pressure, increases by a value $\Delta p$ which is directly dependent on the square of the flow speed $w$.

Now, as soon as a sheet of molten glass is subjected on its topside to the action of a superatmospheric pressure, everything happens as if the glass were subjected to a corresponding increase in its specific weight. This causes a change in the conditions of equilibrium in the glass mass leading to a decrease in the thickness of the sheet in relation to the normal equilibrium thickness of 6.3 mm, this being the thickness that is obtained when the glass is simply left to itself on the bath of liquid tin.

With a given design of the described apparatus it is possible to determine, e.g., experimentally, the conditions under which the rate of flow and the supply pressure of the gaseous fluid fed into the plenum chamber of hood 7 are to be selected in dependence on the thickness desired for the sheets of glass being manufactured. Of course, these conditions will differ according to the temperature or the specific weight of the gaseous fluid, or according to the quality of the glass to be treated, in particular according to its viscosity and according to the variation of this viscosity with temperature.

Because of the relatively high specific weight and of the perfect cohesion of the batch of molten tin, it is possible with the described installation to produce sheets of glass of practically constant thickness and of perfect planeness. Thicknesses as low as about 1 to 2 mm can be realized by this method.

Figure 2:
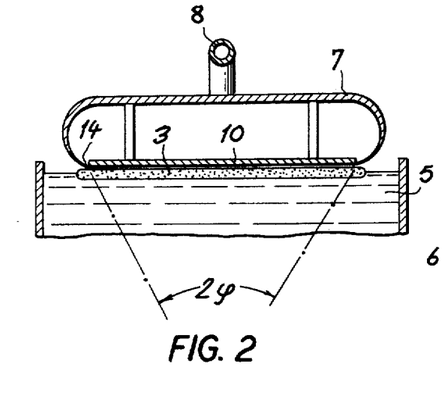
FIG. 2 is a cross-sectional view taken on the line II — II of FIG. 1.
Figure 4:
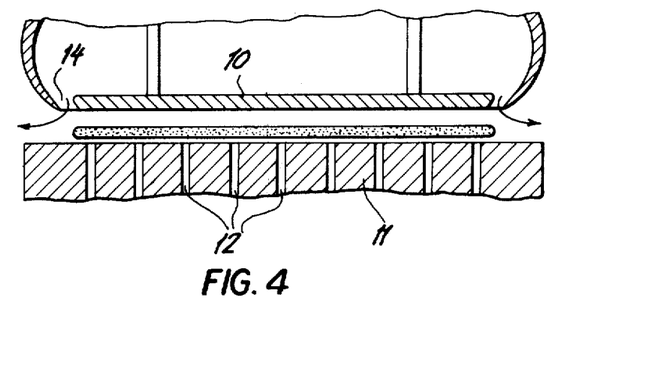
FIG. 4 is a cross-sectional view similar to FIG. 2, illustrating a somewhat different structure.

FIG. 4 illustrates a structural modification of the installation of FIGS. 1–3. The mass of glass 3 to be formed is deposited here not on a bath of molten tin but on a film of gaseous fluid, e.g., air, this film being formed on the top surface of a horizontal bed or base 11 through which extend a plurality of vertical channels 12 that are connected at their lower ends to a source of the film-forming fluid.

With this particular construction the bed 11 need not necessarily be plane. For instance, the bed could have a convex curvature, thus enabling the manufacture of glass sheets of lenticular cross-section. With a bed 11 of undulating cross-section, the resulting sheets of glass would then have one corrugated side and one flat side.

The air-curtain generator consisting of a hood with a plate disposed in a bottom opening of the latter could be replaced by separate nozzles disposed over the entire length of the edges of the operative zone of the molten tin bath (FIG. 1) or of the perforated base which emits the sheet-supporting gas (FIG. 4), these nozzles being each supplied by an individual source of gaseous fluid under pressure or by a common source. The cross-section and the inclination of these nozzle would of course have to be determined in dependence on the aforestated relationship.

Means may be provided for varying the distance of plate 10 above the fluidic support whereby the thickness of the produced sheets can be adjusted; this has been indicated schematically by arrow A in FIG. 3. The sheet thickness can also be adjusted by changing the supply pressure of the gas fed to the plenum chamber of the hood, and therefore its flow speed $w$.

Figure 5:
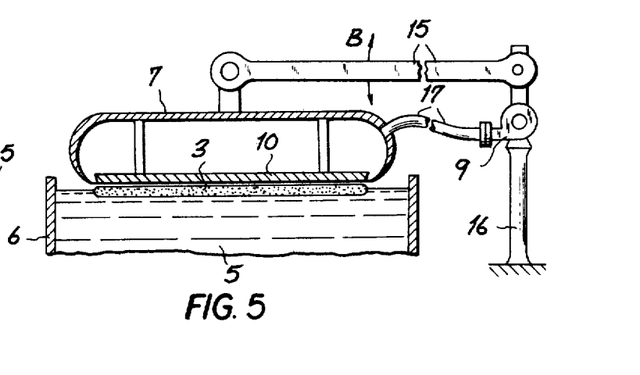
FIG. 5 is another cross-sectional view similar to FIG. 2, showing a modification.

The pressure head existing in the space below plate 10 can also be used for a floating support of the overlying structure including that plate and the hood 7. For this purpose, as illustrated in FIG. 5, that structure may be movably suspended by one or more arms 15 pivoted on a fixed mounting 16 which is also shown to carry the blower 9; in this case, the blower is connected with the plenum chamber of hood 7 through a flexible conduit 17. Such a flexible conduit will not be needed where, as shown in FIG. 1, the blower is directly mounted together with its drive motor on the floating structure.

Obviously, the floating plenum-chamber support of FIG. 5 can also be used with a perforated base of the type illustrated in FIG. 4.

With a hood-and-plate assembly 7, 10 of given weight, the pressure $p_i$ will remain constant whatever may be the pressure $p_o$ of the gaseous fluid being fed into the hood 7, it being understood that the distance $h$ between the plate 10 and the subjacent mass of glass will vary in the same sense as $p_o$ as a result of the change in flow speed $w$.

By increasing the weight of the hood, as by the addition of ballast suitably placed so that the assembly 7, 10 should retain a balanced setting, it would be possible, with a given pressure $p_o$, to decrease the distance $h$ and hence to increase the pressure $p_i$ of the gaseous fluid acting on the mass of glass being shaped, thereby bringing about a corresponding reduction in the thickness of this mass.

Figure 6:
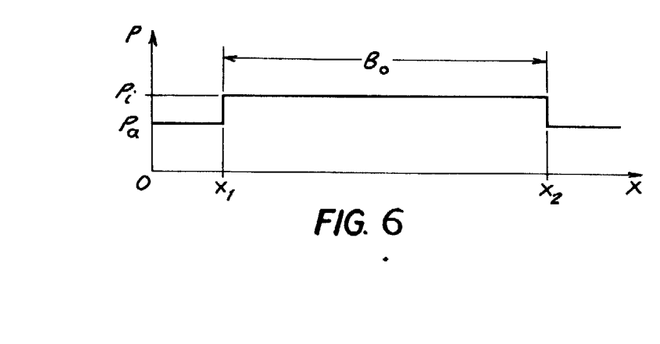
FIG. 6 is a graph showing the transverse pressure distribution in the system of FIG. 1.

In FIG. 6 we have plotted the distribution of air pressure along the glass layer 3 as measured in its transverse direction $x$. It will be noted that, starting from the left-hand edge of the glass layer 3 ($x = 0$), the pressure $p$ is first at the atmospheric level $p_a$ and then, at a distance $x_1$, rises sharply to the elevated level $p_i$ which it maintains to a point $x_2$, returning thereafter to the atmospheric value $p_a$. The distance between points $x_1$ and $x_2$ has been designated $B_o$ and represents the useful width of the glass sheet, i.e., the width of its intermediate portion of reduced thickness crushed by the elevated pressure $p_i$.

Figure 7:
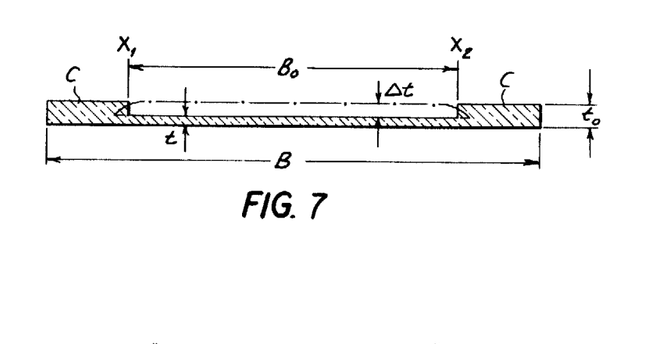
FIG. 7 is a cross-sectional view of a glass layer whose thickness is modified by the pressure distribution of FIG. 6.

As illustrated in FIG. 7 this intermediate portion has a thickness which is a fraction of the equilibrium thickness $t_o$ of the original layer. Two longitudinal edge beads C flanking the crushed center portion retain the original thickness $t_o$. The difference between these two thicknesses has been designated $\Delta t$; the deformed glass mass has an overall width B. It should be noted that this width B is somewhat larger than that of the glass mass issuing from the furnace 1, owing to its thickness reduction $\Delta t$. In the specific example illustrated, the combined width $B - B_o$ of edge beads C is a substantial fraction of the sheet width $B_o$.

Although these edge beads cannot be eliminated, for the reason explained above and also because they serve as useful guides in the subsequent trimming of the glass sheet, it is desirable to reduce their width as much as possible. In accordance with my present invention this can be accomplished by repeating the aforedescribed crushing operation with a broader air curtain under at least the same pressure $p_i$ as before. Since parts of the beads C are now overlain by the zone of increased pressure, these parts will now also be crushed and made level with the center portion bracketed thereby, so that the portion of reduced thickness $t$ now has a new width $B_1 > B_o$. The overall width $B$ also increases, but to a lesser extent so that the beads C are narrowed. The same procedure can be repeated several times with successive increases in the useful width to progressively higher values $B_2$, $B_3$, etc.

The expansion of the air curtain should be carried out at such a slow rate that the glass (which of course is kept fluid throughout the operation) has a chance to follow that expansion before being subjected to additional pressure. The equlibrium position is defined as that in which the marginal zone of the layer, having received the excess glass mass displaced from the crushed central portion, has widened and leveled off at the equilibrium thickness. The expansion of the air curtain could be continuous, keeping pace with the leveling process, yet in practice it will generally be easier to operate in consecutive steps. The time for widening the layer depends, for a given cushion pressure, primarily on the viscosity and therefore on the temperature of the glass mass.

With the glass mass advancing continuously at a velocity $v$, the length of the air cushion should be sufficient to let the desired widening take place.

Let us now consider the effect of successive increases in air pressure above the glass layer under the simplifying assumption that the marginal zones C are absent and that the pressure is uniform across the entire layer. If $t$ is the thickness of the layer in its state of equilibrium, and if that thickness is reduced by a decrement $\Delta t$ with constant ratio $n = t/\Delta t$, the width $B_k$ of the crushed layer after $k$ compression steps satisfies the relationship:

$$B_k = B_o \sum_{m=0}^{k} n^{-m} = B_o \frac{n^{k+1} - 1}{n^k (n-1)}$$

In the theoretical case of $k \to \infty$, the foregoing equation reduces to:

$$B_\infty = \frac{nB_o}{n-1}$$

The following table gives both the total increase in sheet width, i.e. the ratio $B_k/B_o$, and the incremental change of that width, i.e. $\Delta B/B_o$ (with $B = B_{k-1}$), for two representative values of $n$, namely $n = 1.5$ and $n = 2$:

|   | $n = 2$ | | $n = 1.5$ | |
|---|---|---|---|---|
| $k$ | $B_k/B_o$ | $\Delta B/B_o$ | $B_k/B_o$ | $\Delta B/B_o$ |
| 0 | 1 | 0.5 | 1 | 0.666 |
| 1 | 3/2 | 0.25 | 5/3 | 0.445 |
| 2 | 7/4 | 0.135 | 19/9 | 0.300 |
| 3 | 15/8 | 0.0525 | 65/27 | 0.195 |
| 4 | 31/16 | 0.0312 | 211/81 | 0.130 |
| 5 | 63/32 | | 665/243 | |
| $\infty$ | 2 | | 3 | |

It will be noted that in both instances the theoretically ultimate sheet width $B_\infty$ is closely approached in four or five successive compression steps and that already the second step represents a considerable enlargement over the first one.

It can thus be seen that as few as two or three successive compression steps will be quite satisfactory in most instances.

Figure 8:
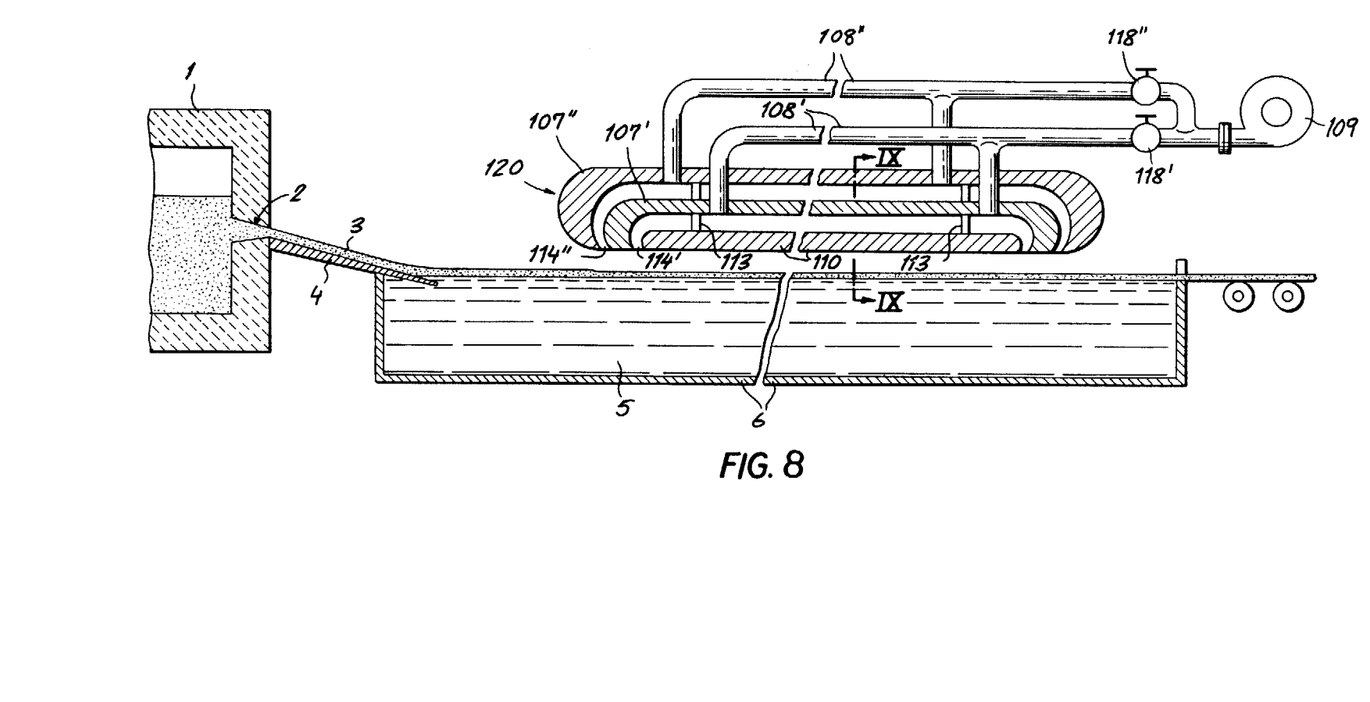
FIG. 8 is a view similar to FIG. 1, illustrating my present improvement.
Figure 9:
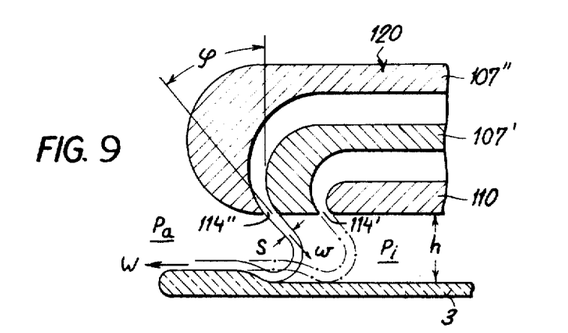
FIG. 9 is a fragmentary cross-sectional view taken on the line IX — IX of FIG. 8.

In FIGS. 8 and 9 I have shown an apparatus similar to the installation of FIGS. 1 - 3, with corresponding components designated by the same reference numerals increased by 100. Thus, the bath 5 is overlain by a structure 120 comprising a central plate 110 embraced by two concentric hoods or caps 107', 107'' which define at the underside of the structure, i.e. on the level of the lower face of plate 110, a pair of concentric peripheral gaps 114', 114'' constituting the discharge slots of respective plenum chambers.

These chambers communicate with blower 109 via respective conduits 108', 108'' provided with valves 118', 118'' which are successively opened and closed to let the air from the blower escape first through the inner gap 114' and then through the outer gap 114''. The hoods 107', 107'' are rigidly secured to each other and to the plate 110 by struts 113 so that each gap has a fixed position and width.

As best seen in FIG. 9, the gaps are again so oriented that the air curtains generated by them, of width S and flow speed $w$, converge downwardly at an angle $\phi$ approximately equal to that in FIGS. 2 and 3, i.e. between about 45° and 70°. In the first stage of operation, the air curtain generated by gap 114' has the contour $c-a$ indicated in FIG. 10 (with omission of the downstream half of the curtain). Upon the subsequent switchover to gap 114'' the air curtain has the contour $c-b$.

Figure 10:
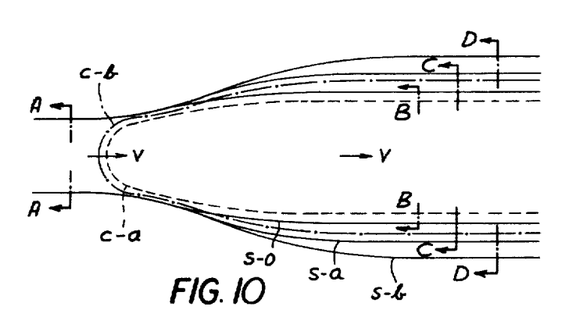
FIG. 10 is a plan view of a glass layer as treated in the system of FIGS. 8 and 9, indicating schematically the contours of the layer in different stages of operation.
Figures 10A, 10B, 10C, 10D:
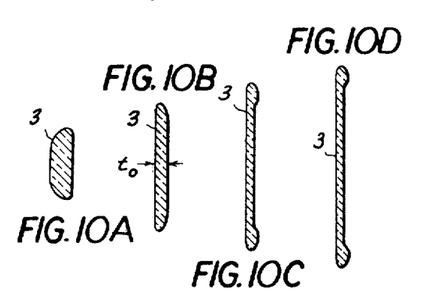
FIGS. 10A, 10B, 10C and 10D are enclosed sectional views respectively taken on the lines A—A, B—B, C—C and D—D of FIG. 10.

Initially, i.e. under atmospheric pressure in the absence of either air curtain, the glass flow has the contour $s-o$, shown in FIG. 10, and a cross-section at the furnace outlet 2 as shown in FIG. 10A: this cross-section remains substantially unaffected by the subsequent pressure increase. FIG. 10B shows the cross-section of the layer atop the bath 5 within trough 6; the glass mass has the equilibrium thickness $t_o$ throughout its width. Upon the discharge of the first air curtain through gap 114' the glass layer expands and assumes the cross-section shown in FIG. 10C which generally corresponds to the profile illustrated diagrammatically in FIG. 7; the contour of the crushed glass layer has been indicated at $s-a$ in FIG. 10. Finally, the second air curtain emitted by gap 114'' produces the contour $s-b$ and the cross-section shown in FIG. 10D.

In order to prevent any return of the outwardly displaced glass mass toward the center during the shift from the inner gap 114' to the outer gap 114'', the inner air curtain should be turned off simultaneously with or after the deployment of the outer air curtain.

Thus, the two curtains could coexist for a certain period.

Figure 11:
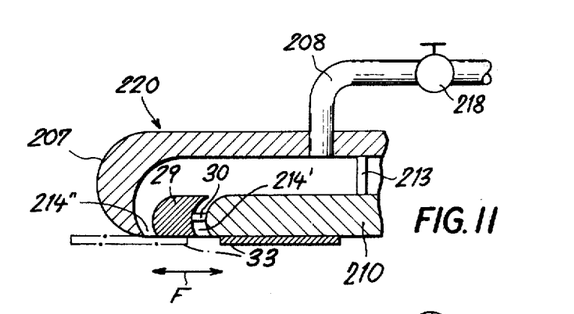
FIG. 11 is a view similar to FIG. 9, showing another embodiment.

In FIG. 11, elements analogous to those of FIGS. 8 and 9 have been designated by corresponding reference numerals with substitution of a 2 for the 1 in the position of the hundreds digit. The structure 220 comprises a single hood 207 defining with plate 210 a plenum chamber which receives air under pressure by a conduit 208 and a valve 218 from the nonillustrated blower. Hood 207 and plate 210 define with each other a rather wide peripheral gap which is subdivided by an insert 29, supported by stays 30, into an inner slot 214' and an outer slot 214''.

A shutter 33 is shiftably mounted on the underside of plate 210 (arrow F) so as to obstruct either the outer slot 214'', as indicated in phantom lines, or the inner slot 214', as shown in solid lines. Shutter 33 is a strip extending parallel to the longitudinal edges of the glass layer, there being another such shutter on the nonillustrated right-hand half of structure 220. Insert 20 is a bar which is similarly duplicated along the opposite edge of the structure. At the upstream, and downstream ends the two peripheral slots 214' and 214'' may merge into one since a longitudinal expansion of the air curtain is not needed in the case of a flowing glass mass.

Figure 14:
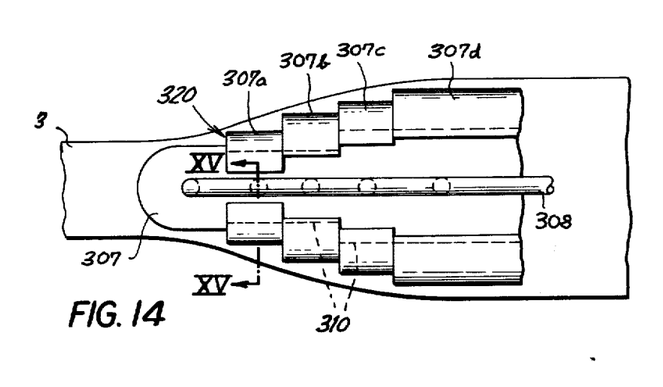
Figure 15:
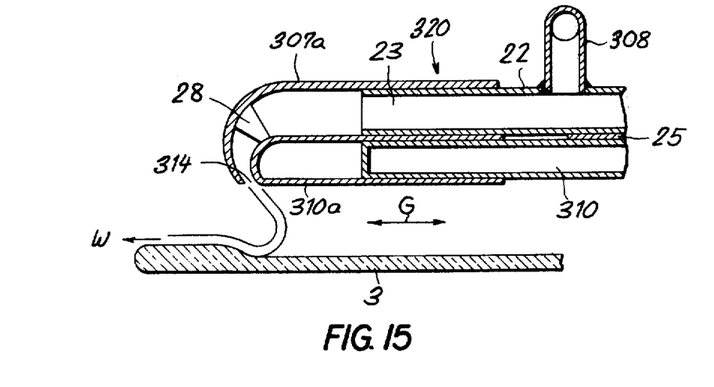
FIG. 15 is a view similar to FIG. 11, taken on the line XV — XV of FIG. 14.
Figure 16:
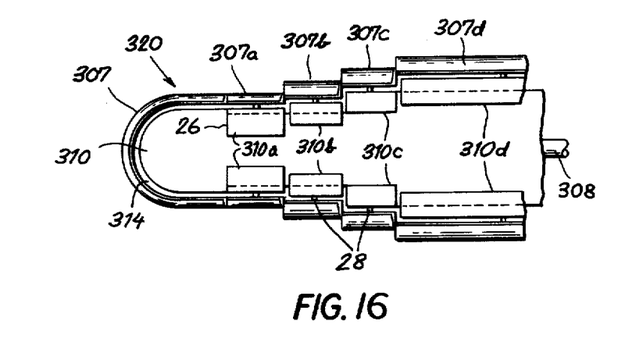
FIG. 16 is a bottom view of the structure shown in FIG. 14.

In FIGS. 12-16 I have shown a modified structure 320 comprising a bottom plate 310 and an associated hood assembly composed of sections 307, 307a, 307b, 307c, 307d; hood section 307 is fixed and closely surrounds the rounded upstream end of plate 310, as best seen in FIG. 16, to form therewith the vertex of a peripheral slot 314. Other parts of this slot are defined by extensions 310a, 310b, 310c, 310d of plate 310 and coacting extensions 307a, 307b, 307c, 307d of the hood assembly which includes a central body 22 rigid with end section 307. Body 22 registers with the plate 310 which has been illustrated as hollow and has a stepped outline as seen in FIG. 16; this body forms a plenum chamber 23 communicating at various locations with an air-supply conduit 308 originating at a nonillustrated blower.

Hood extensions 307a – 307d are connected by respective stays 28 with the associated plate extensions 310a–310d so as to be jointly shiftable therewith in a transverse direction for varying the distance of the several slot sections from the centerline of the structure 320; these extensions slidably embrace the plate 310 and the body 22, respectively, a shim 25 inserted between members 22 and 310 providing the necessary clearance to facilitate such shifting as indicated by arrow G in FIG. 15.

Figure 12:
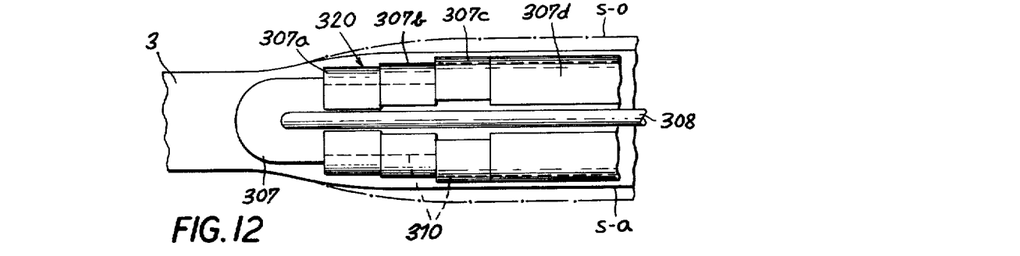
FIGS. 12, 13 and 14 are diagrammatic plan views illustrating different positions of a structure forming part of a modification of the system of FIG. 11.
Figure 13:
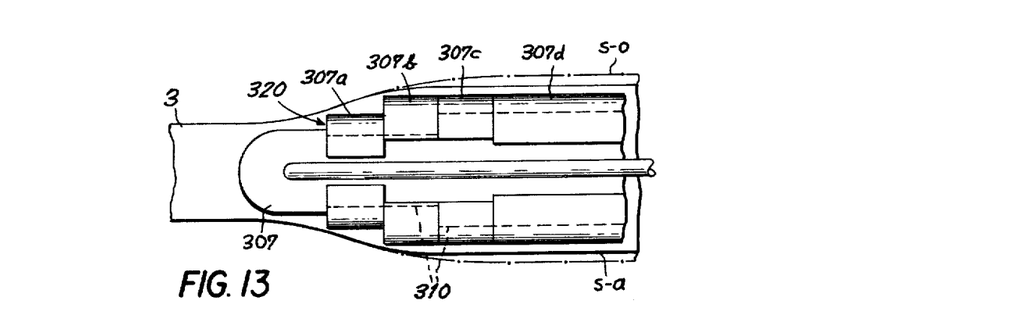

In the position of FIG. 12 the hood sections 307a–307d and the associated plate extensions are inwardly retracted so that the transverse dimension of the peripheral gap and therefore of the air curtain issuing therefrom is at a minimum. With the generation of this air curtain the profile of the glass layer 3 changes from the shape illustrated in FIG. 10B (equilibrium thickness $t_o$) to that shown in FIG. 10C. Next, upstream sections 307a and 307b are shifted to expand the structure, and with it the air curtain, to the postion of FIG. 13 in which the profile of the glass layer approximates that of FIG. 10D. A further expansion step is shown in FIG. 14 in which the downstream sections 307c and 307d are shifted outwardly while the upstream sections 307a and 307b are held in their previous position. This results in an additional flattening and broadening of the glass sheet ultimately produced.

The various operations required to shift the air curtain, as by selectively opening the valves 118' and 118'' of FIG. 8, moving the shutter 33 of FIG. 11 or displacing the hood and plate extensions of FIGS. 12–16, can be carried out automatically by a suitable programmer or manually under remote control. Naturally, the systems shown in FIGS. 8–16 can also be used with an air film according to FIG. 4 replacing the tin bath 5.

As will be apparent from the preceding discussion, the method according to my present invention can be practiced with an air pressure $p_i$ which either remains constant or (through intensification of the expanding air curtain) increases progressively with the size of the area encompassed by the air curtain. In either case, in the presence of a continuous glass flow issuing from the discharge opening 2 of furnace 1 (FIGS. 1 and 8), the progressive expansion of the air curtain to widen the layer portion of reduced thickness need be carried out only at the beginning of operations since the spreading of the glass mass, e.g., as representd by contour s-b in FIG. 10, is preserved as long as the air pressure above that layer portion is maintained. This applies also to the case where, as likewise shown in FIG. 10, the thinned layer portion is widened beyond the original width of the layer (cf. FIGS. 10A and 10D).

I claim:

1. A method of producing sheet glass of a thickness less than normal equilibrium thickness, comprising the steps of:

depositing a layer of molten glass on a predetermined surface area of a fluidic support;

subjecting an intermediate portion of said layer to above-ambient gas pressure within boundaries defined by a descending gas curtain, thereby reducing the thickness of said intermediate portion with resulting broadening of said layer beyond its original width; and expanding said gas curtain to widen said intermediate portion in step with the broadening of said layer while maintaining a surrounding marginal zone of equilibrium thickness.

2. A method as defined in claim 1 wherein the widening of said intermediate portion is carried out beyond the original width of said layer.

3. A method as defined in claim 1 wherein said gas curtain is intensified to increase said pressure head upon expansion of said gas curtain.

4. A method as defined in claim 1 wherein said layer is continuously advanced across said space in the presence of said pressure head.

5. A method as defined in claim 1 wherein said gas curtain converges inwardly, both before and after expansion, at an angle to the vertical ranging between substantially 45° and 70°.

6. A method as defined in claim 5 wherein said gas curtain is generated by delivering gas under pressure from an outside source to a plenum chamber in a flat-bottomed structure and discharging the contents of said plenum chamber through at least one peripheral slot of said structure.

7. A method as defined in claim 6 wherein said gas curtain is expanded by displacing said slot.

8. A method as defined in claim 6 wherein said structure has a plurality of substantially concentric peripheral slots communicating with at least one plenum chamber connected to said source, said gas curtain being expanded by switching the gas flow from an inner slot to an outer slot.

9. A method as defined in claim 1 wherein said structure is floatingly maintained above said support by the excess pressure built up in said space.

10. An apparatus for producing sheet glass of a thickness less than normal equilibrium thickness, comprising:

a fluidic support for a layer of molten glass;

casting means for depositing said molten glass on a predetermined surface area of said support;

a solid structure with a flat underside spacedly overlying a portion of said surface area with a separation sufficient to prevent physical contact between said structure and the layer to be deposited thereon;

guide means forming around said structure a flow path for a peripheral gas stream;

a souce of gaseous fluid under pressure discharging from above into said flow path for generating a peripheral gas curtain around said underside with a lateral inwardly directed pressure component, thereby building up an above-ambient pressure head in the space separating said underside from said surface area; and control means for said guide means operable to vary the distance of said gas curtain from the circumference of said structure.

11. An apparatus as defined in claim 10 wherein said structure comprises a horizontal plate bounding said space from above, said guide means forming at least one plenum chamber above said plate and at least one continuous peripheral gap around said plate communicating with said plenum chamber, said source including conduit means terminating at said plenum chamber.

12. An apparatus as defined in claim 11 wherein said structure is provided with a plurality of continuous peripheral gaps formed by said guide means in substantially concentric relationship on the level of the underside of said plate, said control means including valve means for selectively switching the flow of gas among said gaps.

13. An apparatus as defined in claim 11 wherein said guide means comprises a cap surrounding said plate, said control means including shiftable extensions on said cap and said plate defining said gap therebetween.

14. An apparatus as defined in claim 10 wherein said structure is provided with yieldable suspension means floatingly maintaining same above said support by the excess pressure build up in said space.

* * * * *